United States Patent
Lee et al.

(10) Patent No.: US 11,514,055 B2
(45) Date of Patent: Nov. 29, 2022

(54) QUERYING ON HYBRID FORMATS AND STORAGES

(71) Applicant: Oracle International Corporation, Redwood Shores, CA (US)

(72) Inventors: Teck Hua Lee, Belmont, CA (US); Shasank Chavan, Menlo Park, CA (US); Sheldon Lewis, Jal (MX)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 17/018,113

(22) Filed: Sep. 11, 2020

(65) Prior Publication Data

US 2021/0081422 A1    Mar. 18, 2021

Related U.S. Application Data

(60) Provisional application No. 62/900,315, filed on Sep. 13, 2019.

(51) Int. Cl.
*G06F 16/00* (2019.01)
*G06F 16/2455* (2019.01)
(Continued)

(52) U.S. Cl.
CPC .... *G06F 16/24561* (2019.01); *G06F 11/3419* (2013.01); *G06F 16/217* (2019.01); *G06F 16/221* (2019.01); *G06F 16/24542* (2019.01)

(58) Field of Classification Search
CPC .......... G06F 16/24561; G06F 11/3419; G06F 16/217; G06F 16/221; G06F 16/24542; G06F 11/3452
See application file for complete search history.

(56) References Cited

U.S. PATENT DOCUMENTS 4,782,325 A    11/1988    Jeppsson et al.
5,742,792 A     4/1998    Yanai et al.
(Continued)

FOREIGN PATENT DOCUMENTS

EP    2 608 070 A1    6/2013
GB    1 332 631 A    10/1973
(Continued)

OTHER PUBLICATIONS

Shao et al., "Clotho: Decoupling Memory p. Layout from Storage Organization", Proceedings of the 30th VLDB Conference, Toronto, Canada, 2004, 12 pages.

(Continued)

*Primary Examiner* — Augustine K. Obisesan
(74) *Attorney, Agent, or Firm* — Hickman Becker Bingham Ledesma LLP

(57) ABSTRACT

Techniques are described for querying on hybrid formats and storages by a DBMS to leverage faster mirror format (MF) data and completeness of persistent format (PF) data. In an embodiment, the DBMS receives a query that specifies both in-memory and disk-only columns. The DBMS identifies that a scan-based operation is referencing an in-memory column stored within both MF and PF data. The DBMS may initiate performing the operation on the in-memory column on one of the formats of data. While doing so, the DBMS may determine that the actual improvement metric for the operation on the selected format data is not achieving the desired improvement. If so, the DBMS may dynamically switch the performing of the scan-based operation to the other format of the same data.

20 Claims, 9 Drawing Sheets

(51) Int. Cl.
*G06F 16/2453* (2019.01)
*G06F 11/34* (2006.01)
*G06F 16/22* (2019.01)
*G06F 16/21* (2019.01)

(56) References Cited

U.S. PATENT DOCUMENTS

| | | | |
|---|---|---|---|
| 5,778,430 | A | 7/1998 | Ish et al. |
| 5,870,759 | A | 2/1999 | Bauer et al. |
| 6,009,432 | A | 12/1999 | Tarin |
| 6,678,674 | B1 | 1/2004 | Saeki |
| 7,020,661 | B1 | 3/2006 | Cruanes |
| 7,149,769 | B2 | 12/2006 | Lubbers et al. |
| 8,433,684 | B2 | 4/2013 | Munoz |
| 8,856,484 | B2 | 10/2014 | Ben-Tsion et al. |
| 9,292,564 | B2 | 3/2016 | Kamp et al. |
| 9,659,045 | B2 | 5/2017 | Liu et al. |
| 10,067,954 | B2 | 9/2018 | Kociubes |
| 2003/0046270 | A1 | 3/2003 | Leung et al. |
| 2004/0073541 | A1 | 4/2004 | Lindblad |
| 2005/0055380 | A1 | 3/2005 | Thompson et al. |
| 2005/0165798 | A1 | 7/2005 | Cherkauer et al. |
| 2006/0173833 | A1 | 8/2006 | Purcell et al. |
| 2007/0156957 | A1 | 7/2007 | MacHardy et al. |
| 2007/0288718 | A1 | 12/2007 | Cholleti |
| 2008/0059492 | A1 | 3/2008 | Tarin |
| 2008/0256250 | A1 | 10/2008 | Wakefield et al. |
| 2008/0281784 | A1 | 11/2008 | Zane et al. |
| 2008/0281865 | A1 | 11/2008 | Price et al. |
| 2009/0307290 | A1 | 12/2009 | Barsness et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0138123 | A1 | 6/2011 | Gurajada et al. |
| 2012/0173515 | A1 | 7/2012 | Jeong et al. |
| 2012/0323971 | A1 | 12/2012 | Pasupuleti |
| 2013/0117255 | A1 | 5/2013 | Liu |
| 2013/0151524 | A1 | 6/2013 | McKenney |
| 2013/0275365 | A1 | 10/2013 | Wang |
| 2013/0290598 | A1 | 10/2013 | Fiske et al. |
| 2014/0040218 | A1 | 2/2014 | Kimura et al. |
| 2014/0052713 | A1 | 2/2014 | Schauer |
| 2014/0075493 | A1 | 3/2014 | Krishnan et al. |
| 2014/0095519 | A1 | 4/2014 | Liu et al. |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2015/0134670 | A1 | 5/2015 | Liu |
| 2015/0347030 | A1 | 12/2015 | Mathur |
| 2016/0147779 | A1 | 5/2016 | Eguro |
| 2016/0350347 | A1 | 12/2016 | Das |
| 2016/0350371 | A1* | 12/2016 | Das ............... G06F 12/023 |
| 2016/0350375 | A1* | 12/2016 | Das ............... G06F 16/2456 |
| 2017/0031975 | A1 | 2/2017 | Mishra |
| 2017/0060772 | A1 | 3/2017 | Krishnappa |
| 2017/0060912 | A1 | 3/2017 | Liu |
| 2017/0116043 | A1* | 4/2017 | Muthulingam ..... H04L 67/1008 |
| 2018/0011893 | A1 | 1/2018 | Kimura |
| 2018/0075085 | A1* | 3/2018 | Brodt ............... G06F 16/24542 |
| 2018/0075105 | A1 | 3/2018 | Chavan et al. |
| 2018/0081939 | A1 | 3/2018 | Hopeman |
| 2018/0089261 | A1 | 3/2018 | Li |
| 2019/0243926 | A1 | 8/2019 | Kadwe |
| 2019/0286722 | A1 | 9/2019 | Barov |
| 2019/0311057 | A1* | 10/2019 | Sung ............... G06F 16/24552 |

FOREIGN PATENT DOCUMENTS

| | | |
|---|---|---|
| WO | WO2007/078444 A1 | 7/2007 |
| WO | WO 2017/070188 A1 | 4/2017 |

OTHER PUBLICATIONS

Schaffner, et al., "A Hybrid Row-Column OITP Database Architecture for Operational Reporting", dated 2009, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Nirmesh, Malviya, "Recovery Algorithms for In-Memory OLTP Databases", Master of Science Thesis, dated Jul. 1, 2012, 66 pages.
Khalid Sayood:, "Introduction to data Compression", Morgan Kaufmann Publisher, dated Dec. 1996, 4 pages.
Farber et al., "SAP HANA Database—Data Management for Modern Business Applications", SIGMOD Record, dated Dec. 2011, vol. 40, No. 4, 8 pages.
Anonymous:, "Intverted Index—Wikipedia", dated Jan. 9, 2016, https://en.wikipedia.org/w/index.php?title=Inverted_index&oldid=698960983, 4 pages.
Liu, U.S. Appl. No. 16/022,465, filed Jun. 28, 2018, Advisory Action, dated Jul. 26, 2021.
Liu, U.S. Appl. No. 16/022,465, filed Jun. 28, 2018, Notice of Allowance and Fees Due, dated Sep. 2, 2021.
Liu, U.S. Appl. No. 16/022,465, filed Jun. 28, 2018, Corrected Notice of Allowability, dated Sep. 9, 2021.
Liu, U.S. Appl. No. 16/022,465, filed Jun. 28, 2018, Corrected Notice of Allowability, dated Nov. 3, 2021.
Liu et al., U.S. Appl. No. 16/022,465, filed Jun. 28, 2018, Office Action, dated Feb. 23, 2021.
Liu et al., U.S. Appl. No. 16/022,465, filed Jun. 28, 2018, Final Office Action, dated May 17, 2021.
Wang et al., "Investigating Memory Optimization of Hash-index for Next Generation Sequencing on Multi-core Architecture", 2012 IEEE, pp. 665-674.

* cited by examiner

TABLE 200

| | C1 | C2 | C3 |
|---|---|---|---|
| R1 | R1C1 | R1C2 | R1C3 |
| R2 | R2C1 | R2C2 | R2C3 |
| R3 | R3C1 | R3C2 | R3C3 |
| R4 | R4C1 | R4C2 | R4C3 |
| R5 | R5C1 | R5C2 | R5C3 |
| R6 | R6C1 | R6C2 | R6C3 |

FIG. 2A

QUERYING ON HYBRID FORMATS AND STORAGES

BENEFIT CLAIM AND RELATED APPLICATIONS

This application claims the benefit under 35 U.S.C. § 119(e) of provisional application 62/900,315, filed on Sep. 13, 2019, the entire content of which is hereby incorporated by reference for all purposes as if fully set forth herein.

This application is related to U.S. application Ser. No. 14/337,179, filed on Jul. 21, 2014, and issued on Mar. 22, 2016, as U.S. Pat. No. 9,292,564, the entire content of which is hereby incorporated by reference for all purposes as if fully set forth herein; U.S. application Ser. No. 14/841,561, filed on Aug. 31, 2015, and issued on Jun. 5, 2018, as U.S. Pat. No. 9,990,308 the entire content of which is hereby incorporated by reference for all purposes as if fully set forth herein; U.S. application Ser. No. 15/268,521, filed on Sep. 16, 2016, and issued on Feb. 11, 2020, as U.S. Pat. No. 10,558,659 the entire content of which is hereby incorporated by reference for all purposes as if fully set forth herein; and U.S. application Ser. No. 16/022,465, filed on Jun. 28, 2018, the entire content of which is hereby incorporated by reference for all purposes as if fully set forth herein.

FIELD OF THE TECHNOLOGY

The present invention relates to the field of electronic database management, in particular to querying on hybrid formats and storages.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Storing data in fast-access memory naturally speeds up data processing operations by reducing the time required for data input/output (I/O) operations. However, the fast-access memory is generally volatile and expensive (thus, limited in capacity in computers for cost-efficiency). Accordingly, most computer architectures use a hierarchical storage memory approach, in which multiple levels of memory co-exist from the fastest (and therefore, smallest) volatile memory to the slowest (and therefore, largest) non-volatile memory. Various algorithms are deployed that replicate data to the faster cache memory to speed up I/O operations.

In recent years, the fast-access memory has increasingly become cheaper and, thus, more abundantly available within computers. However, the amount of data that is typically used by computer-run applications has also significantly increased. To completely cache larger amounts of data (colloquially referred to as "big data") in the fast-access memory, it would require an exuberant amount of volatile memory. Even with the most advanced compression techniques, a computer system would still run out of space in volatile memory to store large amounts of data. Thus, cache misses (requests for data not present on the fast-access volatile memory) would persist. The missed I/O operation has to fall back on the slow non-volatile (disk) storage.

In a database management system (DBMS), any type of data structure (e.g., table, column, row, data block) may be cached in volatile memory. Since DBMS queries specify operations on the columns of the table and rarely the whole table if a full table cannot be cached in the volatile memory, caching at least a subset of columns of the table may still yield full cache-based I/O operation for a query. The term "selective columns" or "in-memory columns" refers to such a subset of columns of a table. The term "disk column" refers to a column of a table that is, additionally or alternatively, stored on persistent storage. All columns are stored on persistent storage and thus, are disk columns, and a subset of those columns may be stored in the fast-access memory, as selective/in-memory columns. The term "disk-only columns" refers to a column or a portion thereof that is only stored on persistent storage and is not an in-memory column.

When a query references only in-memory columns, the DBMS may perform fast I/O operations on the in-memory columns. For example, a Full Table Scan (FTS) operation will be performed much faster by retrieving data from the volatile memory.

However, when a query references at least one column, which is not an in-memory column, the DBMS has to perform I/O operations on the slow non-volatile memory and thus, incur I/O delay. And, since the DBMS has to perform I/O on the non-volatile memory, which has all the columns of the tables, the DBMS has no need to access further any in-memory columns (even if all but one column of the referenced columns are in-memory columns). Accordingly, an operation, such as the FTS operation, will be performed completely on the disk columns.

The result is that the query cannot possibly take any advantage of in-memory speed up and other in-memory optimizations such as fast-aggregations, predicate push-down, and other features associated with in-memory data processing just because one query-referenced column is not an in-memory column.

BRIEF DESCRIPTION OF THE DRAWINGS

In the drawings of certain embodiments in which like reference numerals refer to corresponding parts throughout the figures:

FIG. 2A is a block diagram of a table used for examples;

DETAILED DESCRIPTION

Figure 1:
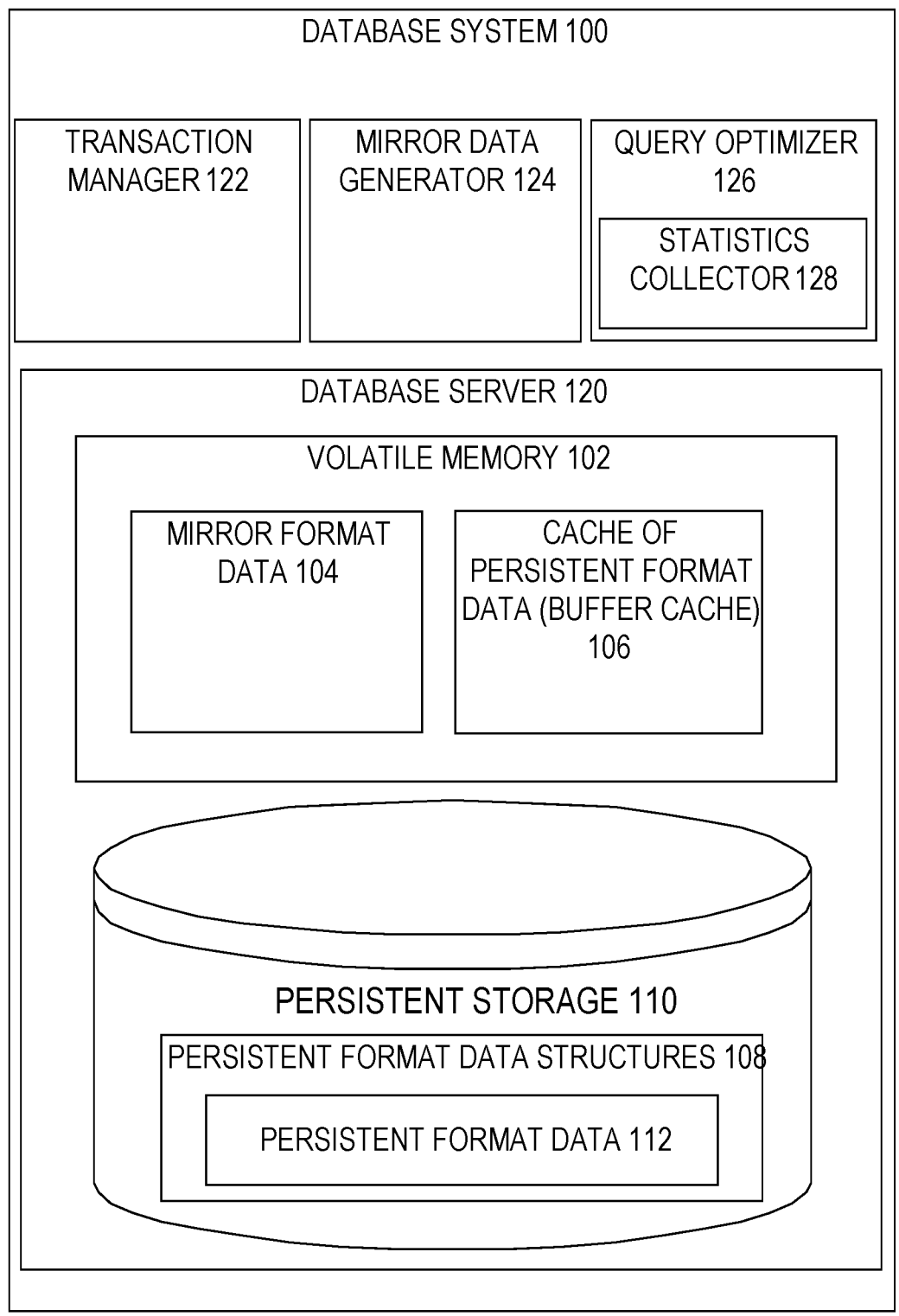
FIG. 1 is a block diagram of a database system that concurrently maintains mirror format data in volatile memory and persistent format data in persistent storage, according to an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

Introduction: Mirror and Persistent Data Formats

Different data formats have different benefits. Therefore, techniques are described herein for maintaining data persistently in one format but making that data available to a database server in more than one format. In one embodiment, one of the formats in which the data is made available for query processing is based on the on-disk format, while another of the formats in which the data is made available for query processing is independent of the on-disk format.

The format that corresponds to the on-disk format is referred to herein as the "persistent format" or "PF". Data that is in the persistent format is referred to herein as PF data. An in-memory format that is independent of the on-disk format is referred to as a "mirror format" or "MF". Data that is in the mirror format is referred to herein as MF data. Further details on a database system that utilizes MF data and PF data are described in "Mirroring, In Memory, Data From Disk To Improve Query Performance," U.S. patent application Ser. No. 14/337,179, filed on Jul. 21, 2014, referred herein as "Mirroring Data Application", the entire content of which is incorporated herein by this reference.

According to one embodiment, the mirror format is completely independent of the persistent format. However, MF data is initially constructed in volatile memory based on the persistently stored PF data, not based on any persistent MF structures. Since persistent MF structures are not required, users of existing databases need not migrate the data or structures in their existing databases to another format. Thus, a conventional database system that uses uncompressed data in disk blocks may continue to use those disk blocks to persistently store its data without performing any data migration, while still obtaining the memory space benefit that results from having a compressed representation of the data available in faster volatile memory.

MF data mirrors data that already exists in PF data. However, while all items in MF data are mirror versions of corresponding items in PF data (albeit organized in a different format), not all items in PF data need be mirrored in MF data. Thus, MF data may be a subset of PF data.

Because not all of PF data is necessarily mirrored within MF data, selection criteria are used to automatically select data portions, such as a column, to be mirrored in MF data from PF data. In an embodiment, various factors about data portions in PF data are used to determine which data portions of PF data to mirror. For example, if a table has columns A, B, and C, and column A has the most frequent read access, then column A may be selected for mirroring from PF data into MF data. In this example, queries that use column A may see an increase in performance, as access to MF data, in volatile memory, is faster than access to PF data in non-volatile memory. Other than considering the access statistics for a data portion, such as the example above, other factors may be considered, such as the data type, operation statistics, and data statistics of the data portion.

Even in situations where queries may require data that can only be satisfied by PF data, MF data may still be used to (a) satisfy a portion of the query, and/or (b) speed up the retrieval of required data from PF data. For example, MF data may be used to identify the specific rows that must be retrieved from PF data.

In an embodiment, various factors may be used to determine whether to compress a data portion in MF data and the level of compression for the data portion. Compression levels dictate how much volatile memory space the data portion occupies, as well as the resources the database system needs to spend to decompress the data portion when the data portion is retrieved. For example, less computational overhead may be needed to decompress some data types relative to other data types. Thus, the database system may automatically determine that the compression level for data portions with such data types should be higher than for other data types. On the other hand, different data portions may be accessed at different frequencies. To save database system resources, the data portions with more frequent accesses may be compressed at a lower level than those data portions with infrequent accesses. Other than the data type and access statistics for a data portion, other factors may include pre-runtime performance statistics of similar data portions within MF data.

In an embodiment, MF data is in columnar or row format and is different from PF data. For example, the PF format is row-major, while the MF format is column-major or vice versa. Regardless of the particular mirror format used, the mirror format data is created in volatile memory based on existing PF structures (e.g., tables and indexes) without causing a change to the format of those structures.

General Overview

Techniques are described herein for executing a query to most efficiently leverage the completeness of PF data and the fast processing associated with MF data. In an embodiment, the techniques describe a new scan-based operation that may dynamically scan data within both MF data and PF data. The term "scan" or "scan-based operation" refers herein to reading rows or portions thereof from memory (MF or PF). The scan-based operation may be inherent in many higher-level database operations such as projection, predicate evaluation, aggregation, or group-by evaluation. Therefore, the techniques described herein that reference a scan-based operation are equally applicable to the database operations of which the scan operation is a part. Accordingly, such higher-level operations may be readily substituted wherever the scan-based operation is referenced herein, and vice versa.

Because the scan-based operation may be performed using either (PF and MF) format data from either or both in-memory column(s) and disk column(s), the techniques herein are referred to as "hybrid scan" techniques. The DBMS utilizes the hybrid scan techniques to perform as much of the data scan-based operation on MF data as the DBMS determines to improve the overall query run-time. For example, the DBMS may determine that scanning a full column within MF data for projection improves the performance of the query because data I/O operations are faster for MF data. In another instance, before or during the performance of the scan-based operation on MF data, the DBMS may determine that performing the operation on MF data will/is not having the desired improvement for the query run-time and that switching to scanning the equivalent disk column(s), within PF data, is more efficient. Accordingly, using the hybrid scan techniques, the DBMS may optimize the scan-based operation(s) of a query that references both in-memory and disk-only columns by dynamically switching scanning between MF and PF data.

In an embodiment, the DBMS determines whether to use MF or PF data based on one or more factors such as a) whether any of the query-specified columns are in-memory columns, b) type of operation(s) for which scan is to be performed on the in-memory columns, c) type of operation(s) for which scan is to be performed on the disk-only columns, d) type of memory (data I/O speed) used by volatile memory and persistent storage, e) expected improvement metric for the operation(s), and f) actual improvement metric for the operation(s).

In an embodiment, the DBMS calculates an expected or actual improvement metric for using MF data for the scan-based operation. The expected improvement metric may be based on pre-runtime statistics for the operation. Pre-runtime statistics for a column include the number of rows/blocks, aggregate row length, non-distinct values (NDV), and value histogram and other data statics. Each of the statistics may be aggregated and/or combined with another or used alone for the determination. For example, the DBMS may determine an expected improvement metric, such as the expected percentage of resultant rows from filtering based on pre-runtime/optimizer statistics.

The actual improvement metric may be based on a run-time metric from the actual result of the operation. For example, the run-time metric may include how many rows (or percentage of rows) are being selected/filtered/aggregated by the operation, or how many distinct row values have been encountered during the operation.

Using the above-described improvement metric, the DBMS may determine for a database operation a) to initially use MF data or PF data, and b) whether to continue using the initially selected data format or to switch to the other format (from PF data to MF data, or MF data to PF data). Non-limiting example queries, for which this determination is made, are the queries with:

A) a query predicate list that includes only in-memory columns and a projection list that includes only disk-only columns;

B) a query predicate list that includes only in-memory columns and a projection list includes at least one in-memory column;

C) a query predicate list that includes only in-memory columns and aggregation or group-by operator(s) of the query reference at least one in-memory column; and D) a projection list that includes only in-memory columns, but the query predicate includes at least one disk-only column.

In an embodiment, for queries A-C, the DBMS determines whether to utilize MF data for a predicate evaluation based on whether the predicate evaluation causes a reduced amount of access to PF data. Thereby, the access to PF data is reduced, if the predicate evaluation within MF data yields low selectivity of rows (i.e., high filtering rate of rows) and thus, lesser rows are accessed within PF data during the rest of the query execution.

To determine whether to initiate the predicate evaluation on MF data or PF data, and whether, during the evaluation, to switch from MF data to PF data or vice versa, the DBMS may utilize selectivity statistics, as an actual improvement metric, for the columns referenced in the predicate evaluation. For example, based on histogram statistics for the columns, the DBMS may calculate the expected improvement metric for the predicate evaluation. Based on this, the DBMS may determine which format data to initiate a scan-based operation on. And during the run-time, the DBMS may calculate the actual selectivity rate as the actual improvement metric to switch, if at all, to the other format data.

In one embodiment, only predicate-based improvements are considered for the particular format data selection. For example, in such an embodiment, project columns (columns that are the selected data sources for projection/output of the query), regardless of being in-memory or disk-only columns, are always projected from PF data. Note that the only rows scanned from PF data are the rows that passed the query predicates in MF data.

In another embodiment, for queries B and C, other improvement metrics may be used to make the determination as to which format data to utilize based on the amount improvement to the projection and aggregation operations, respectively.

For queries like query D, because predicate evaluation has to at least partially be performed on PF data, the DBMS has to determine whether performing the aggregation operation on MF data yields sufficient improvement. To determine the expected and actual improvement metric, the DBMS may utilize number-of-distinct value statistics (NDV) for the group-by key columns. The lesser the number of distinct values, the more improvement that is gained by using MF data. This improvement may be achieved due to optimizations described in U.S. application Ser. No. 15/268,521, filed on Sep. 16, 2016, and issued on Feb. 11, 2020, as U.S. Pat. No. 10,558,659, Aggregation Optimization Application hereafter.

In an embodiment, if a switch occurs from one data format to another, the results generated from the initial data format are combined with the results generated from the subsequent data format. In some embodiment, the DBMS evaluates whether the cost of combination exceeds the cost of re-doing the operation from the start on the subsequent format. The evaluation may depend on the absolute amount of data evaluated or relative to the amount data to be yet operated on. For example, the DBMS may use the results from MF data if a particular number of IMCUs has been evaluated, or if the already evaluated number of IMCUs over the number of to be evaluated IMCUs is above a particular ratio.

General Architecture

FIG. 1 is a block diagram of a database management system according to one embodiment. Referring to FIG. 1, database system 100 includes volatile memory 102 and persistent storage 110. Volatile memory 102 generally represents random access memory used by database system 100 and may be implemented by any number of memory devices. Typically, data stored in volatile memory 102 is lost when a failure occurs.

Persistent storage 110 generally represents any number of persistent storage devices, such as magnetic disks, FLASH memory, and/or solid-state drives. Unlike volatile memory 102, data stored in persistent storage 110 is not lost when a failure occurs. Consequently, after a failure, the data in persistent storage 110 may be used to rebuild the data that was lost in volatile memory 102.

Database system 100 may receive queries from one or more database applications (not shown) for execution on database server 120. To execute a query, database system 100, using query optimizer 126, may first convert the query into an ordered set of operators used to access PF data 112 or MF data 104 in databases server 120. Each operator may contain one or more data operations on output data of another operator or on PF data 112 or MF data 104. Query optimizer 126 may generate a permutation of sets of operators, referred herein as "execution plans." To ensure that the most optimal execution plan is selected, a statistics collector 128 of query optimizer 126 collects and maintains statistics about database system 100, in an embodiment. The term "statistics" refers herein to any numerical representation that describes database management system and data stored in database system 100. The various types of statistics collected by statistics collector 128 are further discussed in the Mirroring Data Application.

PF data 112 resides on persistent storage device 110 in PF data structures 108. The PF data structures 108 may be the structure of PF data 112 on any level of organization, for example, tables, columns, rows, row-major disk blocks, column-major disk blocks, etc.

The volatile memory 102 further includes a buffer cache 106 of PF data. Within buffer cache 106, the data is stored in a format that is based on the format in which the data resides within PF data structures 108. For example, if the persistent format is row-major disk blocks, then buffer cache 106 may contain cached copies of row-major disk blocks.

On the other hand, MF data 104 is in a memory data format that is unrelated to the persistent format. For example, in the case where the persistent format is row-major uncompressed disk blocks, the mirror format may be column-major compression units. Because the mirror format differs from the persistent format, MF data 104 is produced by performing transformations on PF data 112.

Mirror data generator 124 may perform these transformations, which may occur both when volatile memory 102 is initially populated with MF data 104 (whether at start-up or on-demand), and when volatile memory 102 is re-populated with MF data 104 after a failure. In an embodiment, mirror data generator 124 may select data from PF data 112 and mirror the data to generate MF data 104 based on an improvement metric and/or one or more factors described above. Transaction manager 122 maintains transactional consistency between in-memory MF data 104 with PF data 112, in an embodiment.

Significantly, the existence of MF data 104 may be transparent to the database applications that submit database commands to the database server that makes use of MF data 104. For example, applications designed to interact with database systems that operate exclusively on PF data 112 may interact without modification with a database server that maintains MF data 104 in addition to PF data 112. Further, transparent to those applications, that database server may use MF data 104 to more efficiently process some or all of those database commands.

The Mirror Format Data

For the purpose of explanation, it shall be assumed that PF data structures 108 include table 200 illustrated in FIG. 2A. Table 200 includes three columns c1-c3, and six rows r1-r6. While the illustration of table 200 in FIG. 2A portrays how the data is logically organized in persistent storage 110, the actual format in which the data is physically stored may be quite different.

Figure 2B:
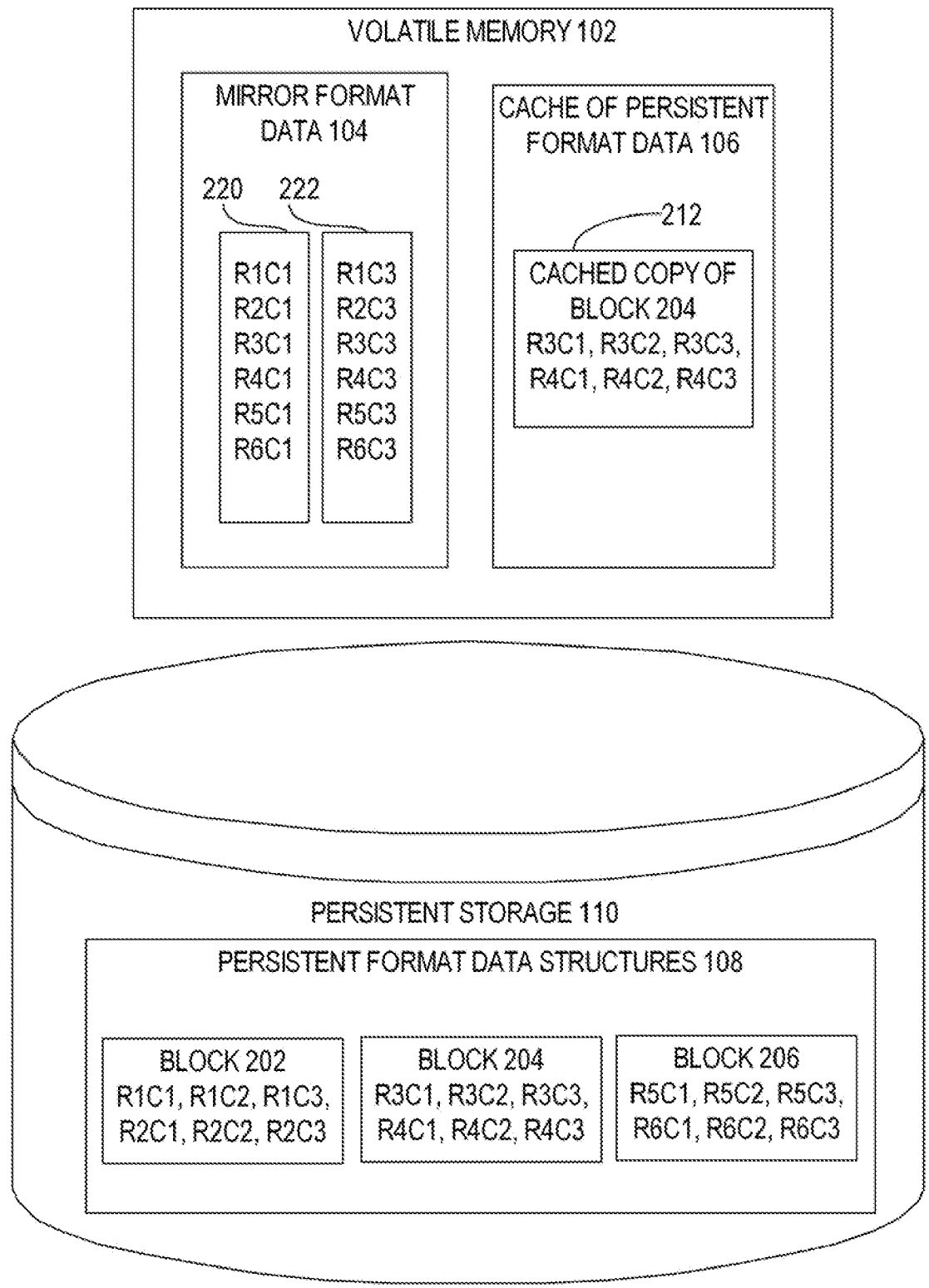
FIG. 2B is a block diagram of how data items for a table may be concurrently maintained in two formats, one of which is an in-memory (mirror) format, according to an embodiment.

Specifically FIG. 2B illustrates how the data that resides in table 200 may be physically organized in persistent storage 110. In the present example, the data for table 200 is stored in three row-major disk blocks 202, 204, and 206. Block 202 stores the values for all columns of row r1, followed by the values for all columns of row r2. Block 204 stores the values for all columns of row r3, followed by the values of all columns of row r4. Finally, block 206 stores the values of all columns of row r5, followed by the values of all columns of row r6.

Copies of some of those disk blocks may be temporarily stored in buffer cache 106. In the example illustrated in FIG. 2B, a cached copy 212 of block 204, resides in buffer cache 106. Buffer cache 106 may be managed using any one of a variety of cache management techniques, and the embodiments described herein are not limited to any particular cache management technique. In general, such techniques attempt to retain in volatile memory 102 copies of the disk blocks that are most likely to be requested in the near future. Consequently, when buffer cache 106 runs out of space, cached copies of disk blocks that are less likely to be requested are replaced by copies of blocks that are more likely to be requested.

In contrast to the data in buffer cache 106, the mirror format data 104 is not formatted in a manner that is based on the persistent format. In the illustrated example, mirror format data 104 includes two column vectors 220 and 222. Each column vector stores a contiguous series of values from a single column of table 200. In the present example, column vector 220 stores values from column 1 of table 200, and column vector 222 stores values from column 3 of table 200. In this example, MF data 104 mirrors a subset of PF data 112 because MF data 104 does not include column vectors for column 2 of table 200.

Organization of MF Data

According to one embodiment, as part of MF data 104, a selected portion is differently formatted than the copy of the selected portion in PF data 112. Even though MF data 104 uses a different format than PF data 112, MF data 104 is organized in a manner that corresponds to the organization of PF data 112. For example, in persistent storage 110, PF data 112 may be stored in blocks that reside in extents, which, in turn, are organized into segments. Under these circumstances, within volatile memory 102, MF data 104 may be organized based on the extents and/or segments to which the data belongs. Thus, column vector 220 may be divided into vector portions, each of which corresponds to a particular range of extents and/or segments.

Within the extents, data is typically ordered by rowid. Similarly, in one embodiment, MF data 104 is ordered based on rowid. For example, the values in column vector 220 are ordered based on the same rowids that are used to order PF data 112 in blocks 202, 204, and 206. Specifically, rowid r1 immediately precedes rowid r2, so r1c1 immediately precedes r2c1 in column vector 220, and r1c1 to r1c3 immediately precede r2c1 to r2c3 in block 202.

In alternative embodiments, some or all of the data items in MF data 104 are not ordered, within MF data 104, by rowid. Storing the data items in a different order may be useful, for example, if the different ordering produced significantly better compression. As another example, the column vectors may initially be ordered by rowid. However, when new updates are "merged into" the column vectors (as shall be discussed in greater detail hereafter), the updated values may be appended to the end of the existing column vectors to avoid having to decompress and recompress the existing column vectors.

When the data items within the column vectors are not in rowid order, an in-memory index may be built on rowid to quickly locate within MF data 104 the data items associated with any given rowid. Whether or not the data items within the column row vectors are ordered based on rowid, a rowid-to-item mapping may be established by maintaining a vector of rowids in conjunction with the column vectors. Other embodiments of the organization of MF data 104 are described in Mirroring Data Application.

When a query is received by database system 100 to execute, both MF data 104 and PF data 112 may be used to satisfy the query. In embodiments where the organization of MF data 104 corresponds to the organization of PF data 112, it is easier for the database server to split database operations between MF data 104 and PF data 112. For example, the database server may determine that MF data 104 is to be used to satisfy a query relative to one range of extents (e.g., extent 1 to extent 10), while PF data is to be used to satisfy the query relative to another range of extents (e.g., extent 11 to extent 20). Other embodiments of using MF data 104 to satisfy queries are further described in Mirroring Data Application.

IMCUSs

According to an embodiment, MF data 104 is cached and maintained within volatile memory 102, such as within a hybrid derived cache described in U.S. application Ser. No. 16/022,465, filed on Jun. 28, 2018, and titled "Techniques for Enabling and Integrating In-Memory Semi-Structured Data and Text Document Searches with In-Memory Columnar Query Processing." Within virtual memory 102, MF data 104 is stored in units referred to herein as an in-memory compression unit (IMCU). Each IMCU stores a different set of MF data.

Figure 3:
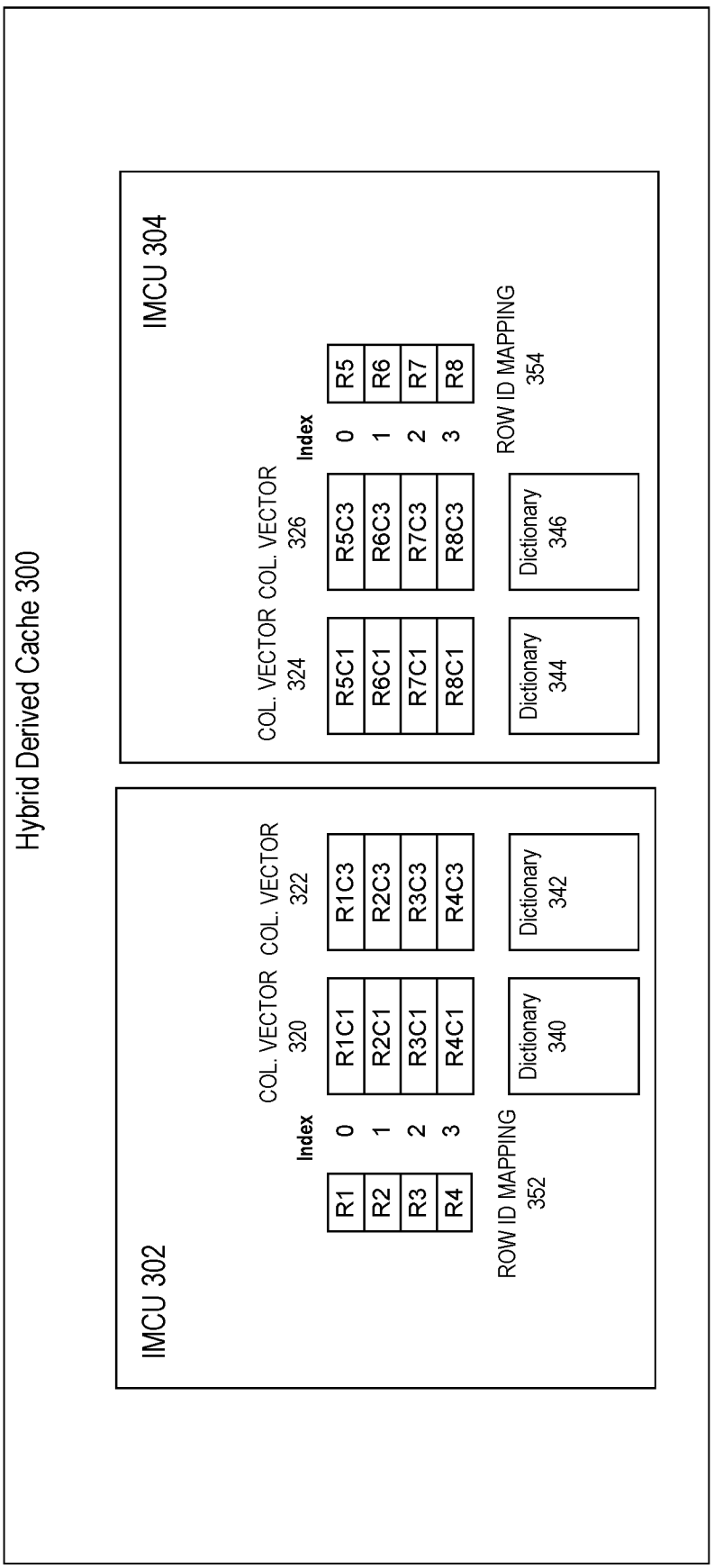
FIG. 3 is a diagram showing a hybrid derived cache to store mirror format (MF) data, according to an embodiment.

FIG. 3 depicts a hybrid derived cache 300 of virtual memory 102, according to an embodiment of the present invention. As illustrated in FIG. 3, hybrid derived cache 300 comprises IMCU 302 and IMCU 304.

IMCUs are organized in a manner that corresponds to the organization of PF data. For example, on persistent storage 110, PF data may be stored in a series of contiguous (within an address space) data blocks. Under these circumstances, within hybrid derived cache 300, MF data 104 stores data from the series of data blocks. IMCU 302 holds MF data from rows R1-R4, and IMCU 304 holds MF data from rows R5-R8.

IMCU 302 holds column values for C1 for rows R1-R4 in column vector 320 and column values for C3 for rows R1-R4 in column vector 322. IMCU 304 holds column values for C1 for rows R5-R8 in column vector 324 and column values for C3 for rows R5-R8 in column vector 326.

The column vectors depicted in hybrid derived cache 300 are dictionary compressed. In dictionary-based compression of a column, a value is represented by a dictionary code, which is typically much smaller than the value the dictionary code represents. A dictionary maps dictionary codes to values. In a column vector of a column, occurrences of a value in a column are represented by a dictionary code within the column vector that is mapped by the dictionary to the value.

According to an embodiment, each IMCU encodes a column vector according to a dictionary for that column vector. Column vector 320 and column vector 322 are encoded according to dictionary 340 and 342, respectively, and column vector 324 and column vector 326 are encoded according to dictionary 344 and 346, respectively.

Each dictionary code in the column vector is stored within a respective element of a column vector, the respective element corresponding to an ordinal position or index. For example, in column vector 324, index 0, 1, 2, and 3 correspond to the first, second, third, and fourth elements respectively.

When the term "row" is used herein in reference to one or more column vectors, the "row" refers to the set of one or more elements across the set of column vector elements that have the same index in each of the column vectors and that correspond to the same row. The row id of the row and the index corresponding to the set of elements may be used to identify the set of elements. For example, row R5 and row 0 refer to the first element in each of column vectors 324 and 326.

A row id mapping 352 in IMCU 302 and row id mapping 354 in IMCU 304 map rows in column vectors to rowids. According to an embodiment, a row id mapping is a column vector that contains row ids. A row in a column vector is mapped to the row id at the same index position of the row in the row id mapping. Element 0 in column vector 324 and column vector 326 are mapped to row R5, which is the value of the element 0 in row id mapping 354.

Hybrid Scan Functional Overview

A conventional database system may operate normally by responding to a query by first searching for the requested data in buffer cache 106. If the data is in buffer cache 106, the data is accessed from buffer cache 106, in which a cached portion of PF data is stored. Otherwise, the needed data is loaded from PF data structures 108 into buffer cache 106, and then accessed from buffer cache 106. However, because the data in both buffer cache 106 and PF data structures 108 is in the persistent format (PF), performing operations based exclusively on PF data does not always provide the best performance. Performing an operation in this way against PF data is referred to herein as PF-side processing.

According to an embodiment, the database server uses MF data to perform at least some scan-based operations needed to execute a database query. Such operations include predicate evaluation, projection, and aggregation. The greater is the portion of database accesses that can be satisfied using MF data for execution of the query, the greater is the effectiveness of the query execution.

Figure 4:
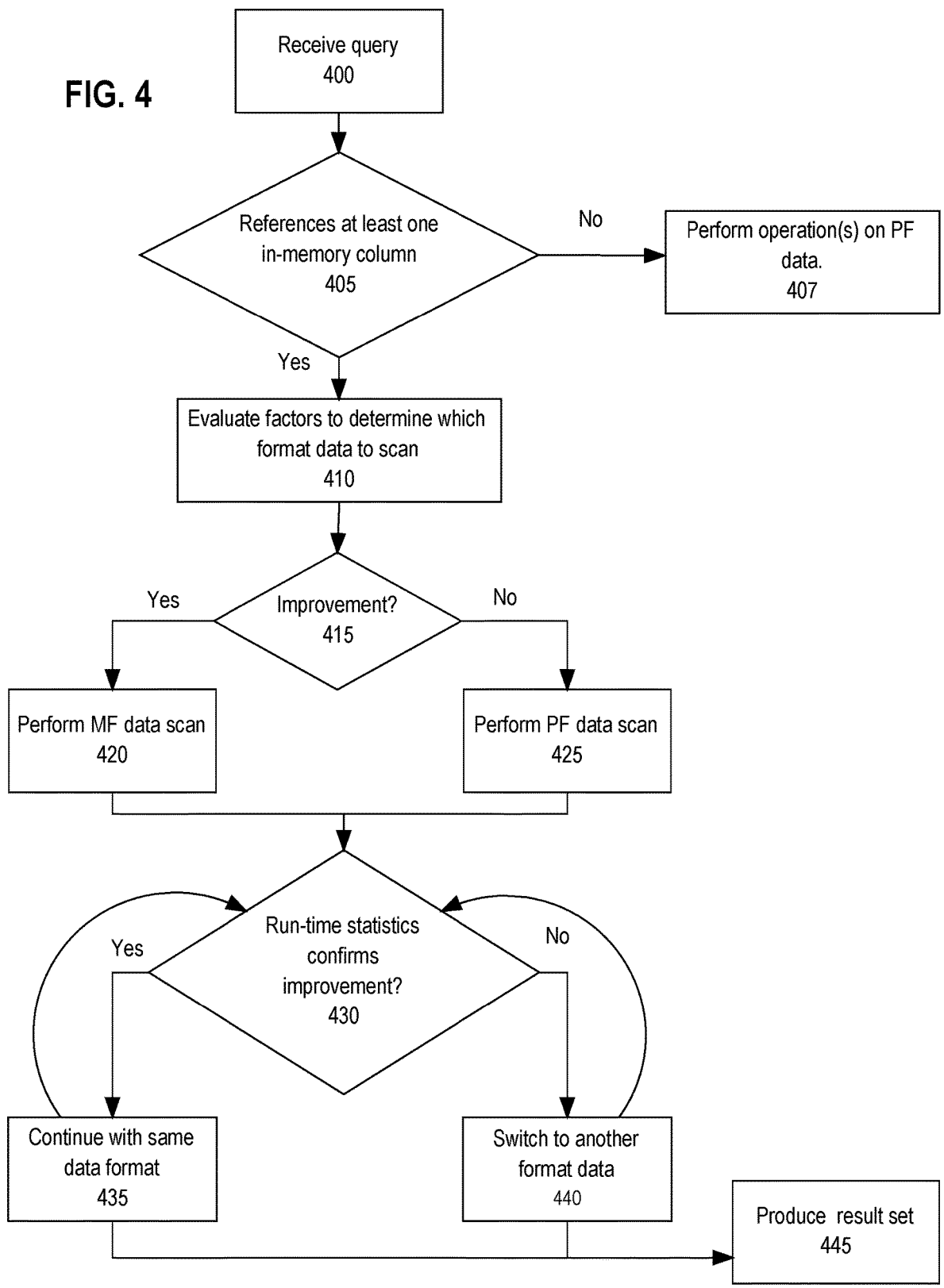
FIG. 4 is a flow diagram that depicts a process for determining whether to use MF data or persistent format (PF) data or both to perform a scan-based operation to execute a database query, in an embodiment.

FIG. 4 is a flow diagram that depicts a process for determining whether to use MF data or PF data or both to perform a scan-based operation to execute a database query, in an embodiment.

At step 400, a query is received by the DBMS. To improve the execution of the query, at step 405, the DBMS determines whether the received query references any in-memory columns to determine whether to perform any scan-based operation on MF data. If the received query references no in-memory column, then the DBMS performs the operations on the disk columns within PF data at step 407.

If, at step 405, the query references at least one in-memory column, then the DBMS determines whether to initiate the scan-based operation on the in-memory column(s) within MF data or the corresponding disk column within PF data In one embodiment, by default, the DBMS proceeds to perform the scan-based operation on in-memory column(s), proceeding directly to step 420 if at least one in-memory column is determined to be referenced at step 405. In another embodiment, at step 410, the DBMS evaluates one or more factors, such as an improvement metric, to estimate an improvement for performing the scan-based operation on the in-memory column(s). For example, the DBMS may determine whether projection, predicate evaluation, aggregation, and/or group-by operation(s) reference only in-memory columns and estimate improvement for executing these operations using MF data.

At step 415, the DBMS determines whether performing the scan-based operation on the in-memory column(s) on MF data is expected to yield a sufficient improvement. In one embodiment, sufficient improvement may be determined based on an improvement metric satisfying a "switch threshold" for that metric.

If at step 415, the DBMS determines the operation would be sufficiently improved by utilizing MF data, the process proceeds to step 420. At step 420, the scan-based operation is executed on MF data. Otherwise, the process proceeds to step 425, and the operation, including the scan-based operation, is executed on PF data.

For example, for a scan-based operation involving a predicate evaluation that references solely in-memory columns, a switch threshold may be a predicate selectivity threshold. The predicate selectivity must be at most 25% (i.e. 75% or more of the rows are filtered out) to execute a hybrid scan using MF data.

The DBMS may use histogram statistics to estimate that the predicate selectivity is 20% (filtering rate of 80%). Since the predicate selectivity threshold is met by the expected improvement metric, the DBMS may initiate the execution of the hybrid scan on the in-memory column.

While the hybrid scan executes on either MF or PF data, the DBMS calculates a run-time improvement metric for the execution based on run-time statistics. The run-time improvement metric indicates that sufficient improvement is actually being realized, at step 430. If, at step 415, sufficient improvement is confirmed, then the DBMS continues the scan within the selected format data. Otherwise, the process proceeds to step 440, and the DBMS continues the scan-based operation on the other format data.

Continuing with the predicate evaluation example above, during the execution, the DBMS collects the actual selectivity metric from the predicate evaluation. The DBMS may determine that the actual selectivity is 50% and, thus above the predicate selectivity threshold. In such a scenario, the DBMS switches the execution of the scan-based operation to be performed on PF data.

In an embodiment, the DBMS re-evaluates which format data to use for the operation multiple times during the operation. While the operation is still executing within either of the formats (at step 435 or step 440), the process proceeds to step 430 to re-evaluate the factors. The frequency/periodicity at which the DBMS re-evaluates the formats of data to scan may be based on a time period, absolute amount of data/rows processed or relative amount of data/rows in the column. If the factors favor continuing the operation within the same format, the process proceeds to step 435, if not, then the process proceeds to step 445. The process is repeated until the scan-based operation is completed.

At step 445, the DBMS produces the results for the operation.

Predicate Evaluation and Row Id Resolution

Figure 5A:
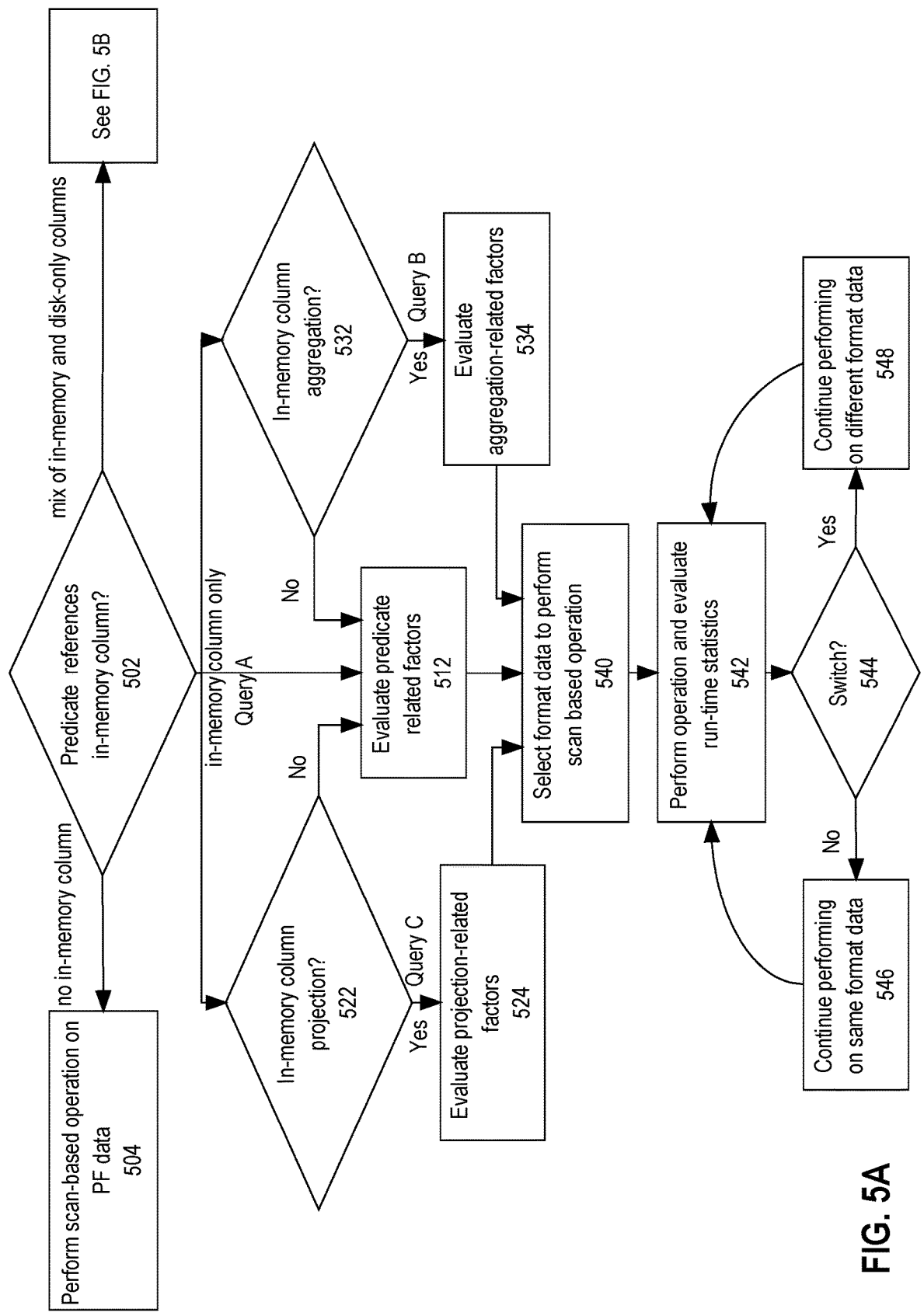
FIGS. 5A and 5B are flow diagrams that depict a process for performing a predicate evaluation with a hybrid scan, in one or more embodiments.

FIG. 5A is a flow diagram that depicts a process for performing a predicate evaluation in a hybrid scan, in an embodiment. At step 502, the DBMS determines whether the predicate references only in-memory column(s). Queries, in which the predicate reference only in-memory columns, such as queries A, B, and C discussed above, are enabled for hybrid scans, in an embodiment. If no in-memory column is referenced, then the scan-based operation is performed on PF data at step 504, in an embodiment.

In one embodiment, at step 512, the DBMS evaluates factors to determine whether performing the predicate evaluation on MF data is going to indeed yield an improvement greater than the resources necessary to execute the operation on PF data. The improvement arises with decreased selectivity, which reduces the number of rows to access within PF data.

The evaluation of the predicate operation on MF data yields a filtering data structure indicating the rows that have satisfied the predicate and, thus, are to be accessed within PF data. Accordingly, the DBMS may perform lesser accesses within higher latency PF data, as the filtering data structure that includes a subset of rowid mappings thus, filtering certain number of rows. However, if the predicate selectivity is high, more rows are accessed; the performance gain may be none or negligible compared to the overhead of generating the filtering data structure. Stated differently, there is no performance gain in performing the predicate evaluation on MF data if such evaluation yields that almost every row within PF data has to be accessed anyway. In such a scenario, performing predicate evaluation on MF data becomes a surplus operation that could be completely avoided by performing the predicate evaluation on PF data.

In an embodiment, to determine selectivity of predicate evaluation, historical statistics, such as optimizer statistics, may be used. Based on the statistics, the DBMS may calculate an expected improvement metric. For example, the received query's WHERE clause may specify that PRICE column of SALES table, which is an in-memory column, has to be above the value of 1000 (WHERE SALES.PRICE>1000). The DBMS may use the histogram data statistics for the PRICE column element values. The histogram statistics may specify that the percentage of rows with values from 800 to 5,000 is 5%, and above 5,000, is 15%. The expected improvement metric based on the selectivity of the predicate is thus at most 20%.

To determine whether an estimated improvement is sufficient, the DBMS may compare the determined expected improvement metric against a switch threshold. The switch threshold represents the point where performing the scan-based operation on MF data is expected to be more efficient than on PF data or vice versa.

In an embodiment, the switch threshold may depend on the difference in speed of data access of MF data from the speed of access to PF data. Stated differently, when PF data access is relatively fast, a greater amount of filtering has to happen to justify the overhead of the predicate evaluation on MF data. For example, if the volatile memory, on which MF data is stored, is a DDR RAM and the persistent storage or a cache thereof, on which PF data is stored, is a FLASH-based memory, then the speed of performing a scan-based operation within PF data is not significantly slower than performing a scan-based operation on MF data. Therefore, the improvement has to be significantly greater to compensate for the additional cost of using MF data.

Additionally or alternatively, the switch threshold may account for the additional resources needed to combine the results of the scan-based operation on MF data with the results produced within PF data. If the overhead for using MF data is negligible, then no threshold may be necessary, and the operation is always performed on MF data.

Continuing with the example of the PRICE column predicate evaluation, the DBMS may have a predicate improvement threshold of 70% selectivity. If the expected selectivity is higher than (or equal to) 70% for the values in the PRICE column (less than 30% filtering rate), then the DBMS initiates the predicate evaluation on the PF data. Otherwise, if the expected improvement metric is lesser than (or equal to) 70% (greater than or equal to 30% filtering rate), the DBMS uses MF data for predicate evaluation of the PRICE column values and generates a filtering data structure to perform PF data retrieval by skipping the filtered out rows. In this example, the histogram statistics indicates 20% selectivity (80% filtering rate), and thus, the DBMS initiates the predicate evaluation in the MF data. The DBMS instantiates a filtering data structure to record the results of predicate evaluation mapped to selective rows in PF data.

Continuing with FIG. 5A, at step 540, the DBMS determines which format data to use for the predicate evaluation and evaluates the operation, at step 542, on the selected format data.

At step 542, the DBMS collects run-time statistics to determine whether the actual improvement metric is consistent with the determination at step 512. For the predicate evaluation being executed on MF data at step 542, at step 544, the DBMS determines whether the actual improvement metric satisfies the threshold. If so, then the DBMS continues the hybrid scan on MF data and generating filtering data structure at step 546.

Similarly, for the predicate evaluation being executed within PF data at step 542, if the collected metric is inconsistent with the evaluation at step 512 and is above the switch threshold, at step 544, then the DBMS switches the hybrid scan from PF data to MF data, at step 548.

In an embodiment, the DBMS evaluates actual improvement metric multiple times during the predicate evaluation. Based on this evaluation and comparison with the switch threshold at steps 542-544, the process may continue performing hybrid scan within MF data, at step 546, or switch to PF data, at step 548; or vice versa, continuing within PF data, at step 546, or switch to MF data, at step 548. The process may transition from step 546/548 to step 542 for re-evaluation based on time period or amount of data/rows processed (or any combination and statistical aggregation thereof).

Even if the predicate is evaluated only partially within MF data, the partial evaluation result has to be combined with rows in PF data. According to an embodiment, predicate evaluation against multiple columns can be performed by accessing MF data in IMCUs of the hybrid derived cache. For each column cached in an IMCU, the results of a predicate evaluation are recorded in a filtering data structure, such as an index-aligned result vector. In an indexed aligned result vector, each bit in a bit vector corresponds to an index of a column vector, with bit 0 corresponding to the $0^{th}$ index, bit 1 corresponding to the $1^{st}$ index, and so forth. The term "result vector" is hereafter used to refer to an indexed aligned bit vector. For a conjunctive predicate, multiple result vectors may be generated, each representing the result of a predicate conjunct, and then combined to generate a "return result vector" representing the result of the conjunctive predicate evaluation against columns cached in the IMCU.

The return result vector may be used to perform row resolution. Row resolution uses the return result vector and the row id mapping to generate a return row list that includes the rowids of the rows identified by the return result vector and which satisfy the evaluation represented by the return result vector. The return row list may be used to perform further PF-side predication evaluation of rows in the return row list on any column not cached in the hybrid derived cache 300, or to perform other operations such as projection of the columns not cached, or evaluation of other predicate conditions of the predicate or other predicates in a query.

For example, referring to FIG. 3, a query with the predicate C1="SAN JOSE" AND C3="CA" AND C4>"1400.00" is evaluated by DBMS 100. DBMS 100 evaluates the predicate against C1 and C3 in IMCU 304. A bit vector "1110" is generated for column vector 324 (C1), and a bit vector of "0110" is generated for column vector 326 (C3). Performing an AND operation generates a return vector of "0110". Based on row id mapping 354, rows R6 and R7 are mapped to the set bits in the return vector. DBMS 100 generates a row return list that includes rows R6 and R7. Based on the row return list, DBMS 100 evaluates the rows R6 and R7 against the predicate condition C4>"1400.00" using PF-side predicate evaluation.

Continuing with FIG. 5A, for the predicate evaluation being executed on PF data at step 542, the DBMS determines whether the actual improvement metric fails to satisfy the threshold, at step 544. If so, then the DBMS continues the hybrid scan on PF data and generating predicate results at step 546.

Similarly, for the predicate evaluation being executed on MF data at step 542, if the actual improvement metric is contrary to the evaluation at step 512 and is below the threshold, at step 544, the DBMS switches the hybrid scan from MF data to PF data, at step 548.

In an embodiment, the determination for whether to start or continue the hybrid scan on MF data may be additionally or alternatively based on improvements that may be achieved from execution other query-requested operations on MF data as described in steps 522-524 and 532-534.

At step 524, the DBMS may further determine whether to project rows from MF data to improve the query run-time, if a possible in-memory column projection is identified for the query, at step 522.

For example, for queries that have projections from in-memory column(s), such as query B described above, there may be additional improvements considered for using MF data. In one embodiment, the DBMS determines to project in-memory columns from MF data based on the amount of data I/O required for the projection from within PF data. If the amount of data I/O for projecting the column(s) from within PF data is significant, then, at step 540, the DBMS may determine to initiate projection from within MF data. Otherwise, the DBMS may determine to perform projection using PF data at step 540.

The amount of data I/O may be determined by one or more pre-runtime statistics or combinations thereof. Pre-runtime statistics that may include the number of rows and/or row size of in-memory columns is used to calculate projection-related expected improvement metric. The projection-related metric may be compared to a switch threshold based on the cost incurred by the DBMS in combining MF data projection with the projection from the remaining disk-only columns projected from PF data using the mapping data structure.

During the run-time, at step 542, the DBMS may determine based on an actual improvement metric that the improvement of using MF data may not meet the switch threshold (e.g., not enough rows being projected and/or average row size of in-memory column(s) are too small). If the threshold is not met at step 544, the DBMS reverts to executing the rest of the run-time on PF data, at step 546.

Similarly, if the DBMS, at step 524, determines to use PF data for the projection at step 540 because the switch threshold was not met for a projection-related metric, but during the run-time of the projection, the threshold is met, at step 542. Then, at step 544, the DBMS performs the switch of the memory data format and performs the projection on MF data, at step 548. Otherwise, at step 546, the DBMS continues to perform projections using the memory data format selected at step 540.

Additionally or alternatively, the DBMS may further determine whether aggregation of in-memory columns improves the query run-time, at step 534, if a possible in-memory column aggregation is identified for the query at step 532. At step 532, the DBMS may further determine that if the query references a group by key and/or an aggregation key that are in-memory column(s), as described for query C above. The DBMS may determine that further improvement is achieved by performing aggregation and/or group-by operations on MF data, using the techniques described in the Aggregation Optimization Application.

At step 534, the DBMS may consider aggregation-related statistics to select a particular format data on which to aggregate/group. To determine if the optimizations for performing aggregation within MF data achieve the necessary improvement above the cost of integration results with those from PF data, the DBMS may compare the aggregation related improvement metric to a switch threshold. For example, NDV of a group-by key column may be indicative of how much aggregation/grouping is going to be performed.

When the particular format data is selected at step 534, during the performance of grouping/aggregation at step 540, the DBMS evaluates the actual run-time aggregation related improvement metric. For example, the DBMS may track the actual number of rows that are aggregated/grouped, Similar to query B, for query C, if the threshold is not met, the DBMS may revert to continue with PF data, or, if met, may continue with MF data, and vice versa.

In an embodiment, when a query references an in-memory column for group-by operation, the DBMS performs such operation on MF data at step 542. For example, the DBMS may generate dense grouping keys (DGK) from the group-by key and a mapping vector mapping DGK(s) to rows to be aggregated for each DGK. DGK mapping vector may be used on PF data for the aggregation operation of disk columns (if any are so specified by the query).

Additionally or alternatively, the DBMS may perform an aggregation operation on MF data, if the aggregation key is an in-memory column. The aggregation may be performed based on the MF data-based generated DGK mapping vector or DGK mapping vector generated from PF data.

The DBMS may dynamically switch performing group-by and/or aggregation from MF data to PF data based on the predicate run-time metric. In an embodiment, at step 542, the projection-related metric and/or aggregation related metric may be considered in combination with the predicate-related metric. For a query that specifies a predicate, the DBMS may determine whether the selectivity realized from the predicate evaluation of the query from the total number of rows is above a pre-defined threshold. If so, then the group-by/aggregate evaluation on MF data may yield performance improvement because more data needs to be aggregated, and the DBMS proceeds to perform the operation on MF data. Otherwise, the DBMS proceeds to perform the aggregate/group-by operation on PF data.

Hybrid Scans for Queries with Mixed in-Memory and Disk-Only Column Predicates

For queries containing mixed in-memory and disk-only column predicates, the DBMS has to scan disk-only columns in PF data to evaluate the predicate. Accordingly, unlike queries A-C, for mixed predicate query, like query D, the selectivity of the predicate evaluation may not be as indicative of the improvement of the scan using MF data. The DBMS has to retrieve the rows within PF data to evaluate at least a portion of the predicate, and thus, persistent storage has to be accessed for most (or all) rows.

However, query D may be improved by performing the aggregation on the in-memory column(s). As discussed for query C, due to inherent characteristics of MF data, performing the group-by and/or aggregation operations on MF data yields an improvement in a query run-time. For example, when all group-by and aggregation keys are in-memory columns, the performance of the aggregation operation on MF data may improve the execution greater than the cost of combining the data.

Figure 5B:
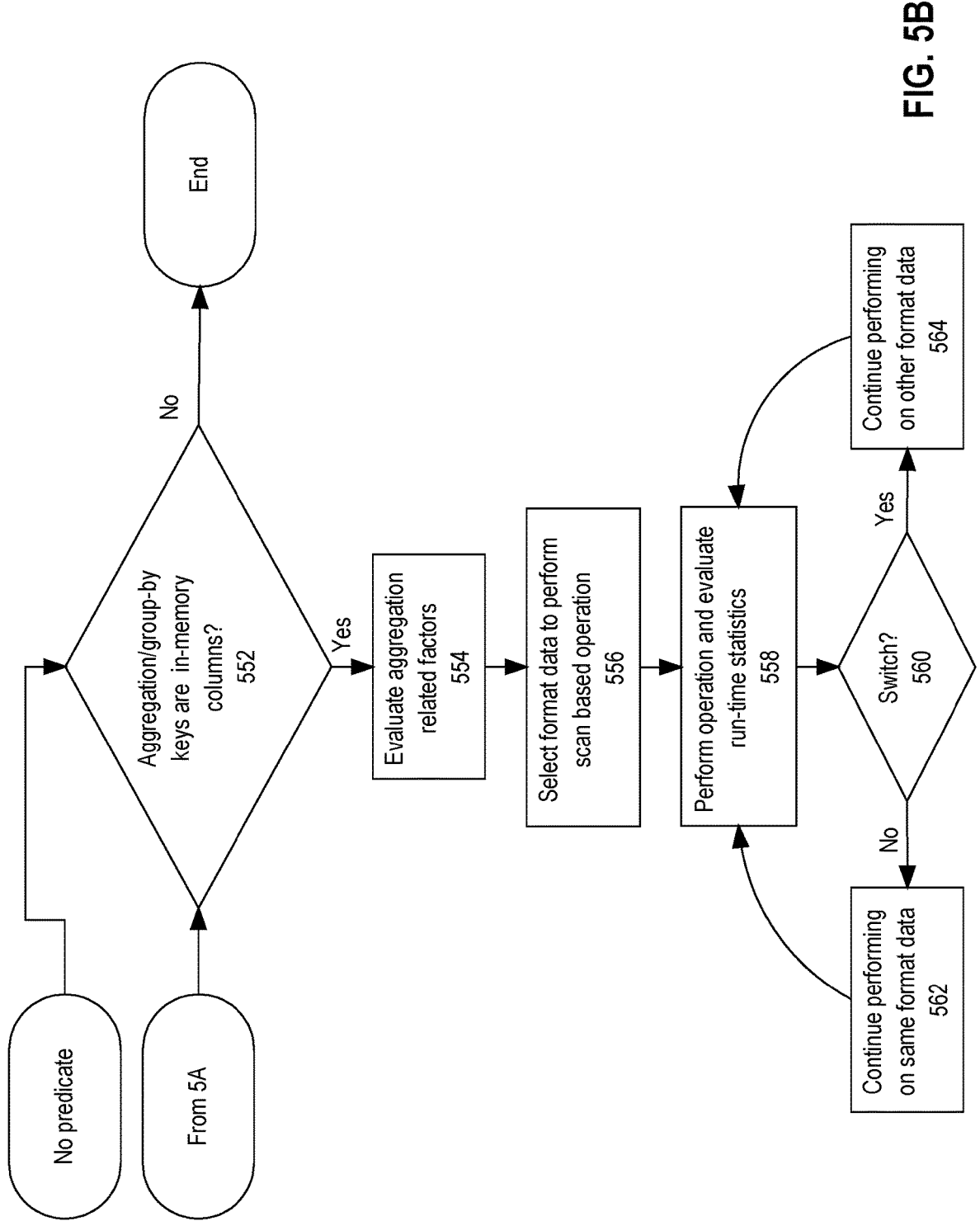

FIG. 5B is a flow diagram that depicts a process for performing a hybrid scan for mixed column predicate evaluation, in an embodiment. If at step 552 of FIG. 5A, the process determines that the query predicate references a mix of in-memory and disk only columns or no predicate is specified in the query, the process proceeds to step 554 to determine whether the query contains any aggregation operation. If no aggregation operation is requested, the process terminates, in an embodiment.

To determine whether to perform an aggregation operation on MF data or PF data, the process evaluates the aggregation-related improvement factor(s) at step 554. In one embodiment, the DBMS estimates whether an improvement in the query run-time is to occur when the aggregation is performed on MF data. The DBMS may compare the aggregation-related expected improvement metric calculated based on the pre-runtime statistics to a switch threshold at step 554. Based on the comparison, the particular format data is selected to perform aggregation at step 556.

The switch threshold may represent the cost of combining results from MF data with results from PF data and/or data access speed difference between the types of data (MF and PF data). The pre-runtime statistics may indicate the amount of aggregation operation to be performed, such as NDV and histogram statistics.

Additionally, for mixed column predicate queries, the greater the selectivity, the greater number of rows is to be aggregated. Stated differently, the more rows that pass predicate evaluation, the more improvement is achieved by performing aggregation within MF data. Thereby, predicate selectivity may also serve as an aggregation-related metric.

When the particular format data is selected at step 556, during the performance of grouping/aggregation at step 558, the DBMS evaluates the actual run-time aggregation related improvement metric. For example, the DBMS may track the actual number of rows that are aggregated/grouped. Similar to queries A-C, for query D, if the DBMS is aggregating/grouping within MF data but the switch threshold is not met, at step 558, the DBMS may perform a switch of format, at step 560, for the rest of operation execution, at step 564. Otherwise, if the threshold is met, the process continues to step 564. Similarly, if the operation was performing within PF data at step 558, the DBMS may continue the aggregation operation within PF data, at step 562 if the threshold is not met, or, if met, may switch from the PF to MF data, at step 564.

The DBMS may dynamically switch multiple times: performing group-by and/or aggregation within MF data, then PF data, and vice versa, based on the continuous tracking of the aggregation-related metric. Based on the newly calculated aggregation-related metric and comparison with the threshold at steps 558-560, the process may continue performing predicate evaluation within MF data, at step 562, or switch to PF data, at step 562; or vice versa. The process may transition from step 562/564 back to step 558 for the re-evaluation based on time period expiration or amount of data/rows processed (or any combination and statistical aggregation thereof).

In another embodiment, queries containing an arbitrary combination of in-memory and disk-only columns in the predicates may execute the predicate evaluation on both MF data and PF data. For example, queries may be rewritten as a self-joins with one join table as an in-memory copy of the table, and the second join table as a disk-only copy of the table. MF data becomes the source of all the in-memory columns in the predicates, while PF data becomes the source of all the disk-only columns in the predicates. Based on the images, the optimizer performs more optimal in-memory column value filtration for the in-memory column predicates and joins the results by row-id with the disk table image, subsequent to which the rest of the predicates are applied. In such an embodiment, all project columns, regardless of in-memory status, are retrieved from disk/buffer cache.

Database Management System Overview

A database management system (DBMS) manages a database. A DBMS may comprise one or more database servers. A database comprises database data and a database dictionary that are stored on a persistent memory mechanism, such as a set of hard disks. Database data may be organized into database objects and stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology to refer to database objects.

In embodiments, the databases may be structured as key-value stores (e.g., NoSQL or JSON) where different database objects may represent different data structures. Key-values and associated objects can be referenced, for example, utilizing look-up tables such as hash tables.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database schema, including database containers, such as tables, views, or complex data types. SQL/XML is a common extension of SQL used when manipulating XML data in an object-relational database. Although the embodiments of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue a series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an embodiment, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 6:
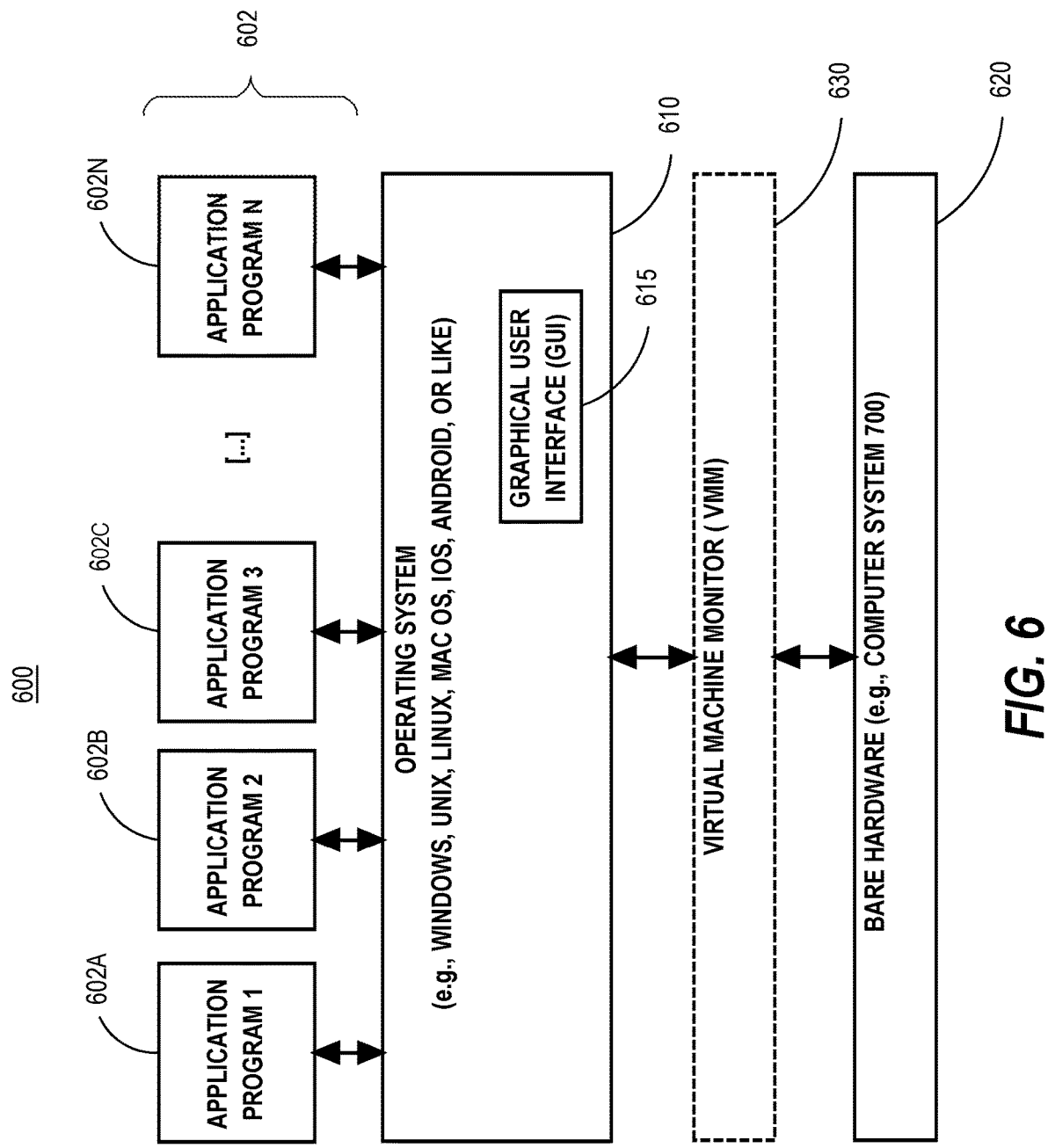
FIG. 6 is a block diagram of a basic software system, in one or more embodiments.
Figure 7:
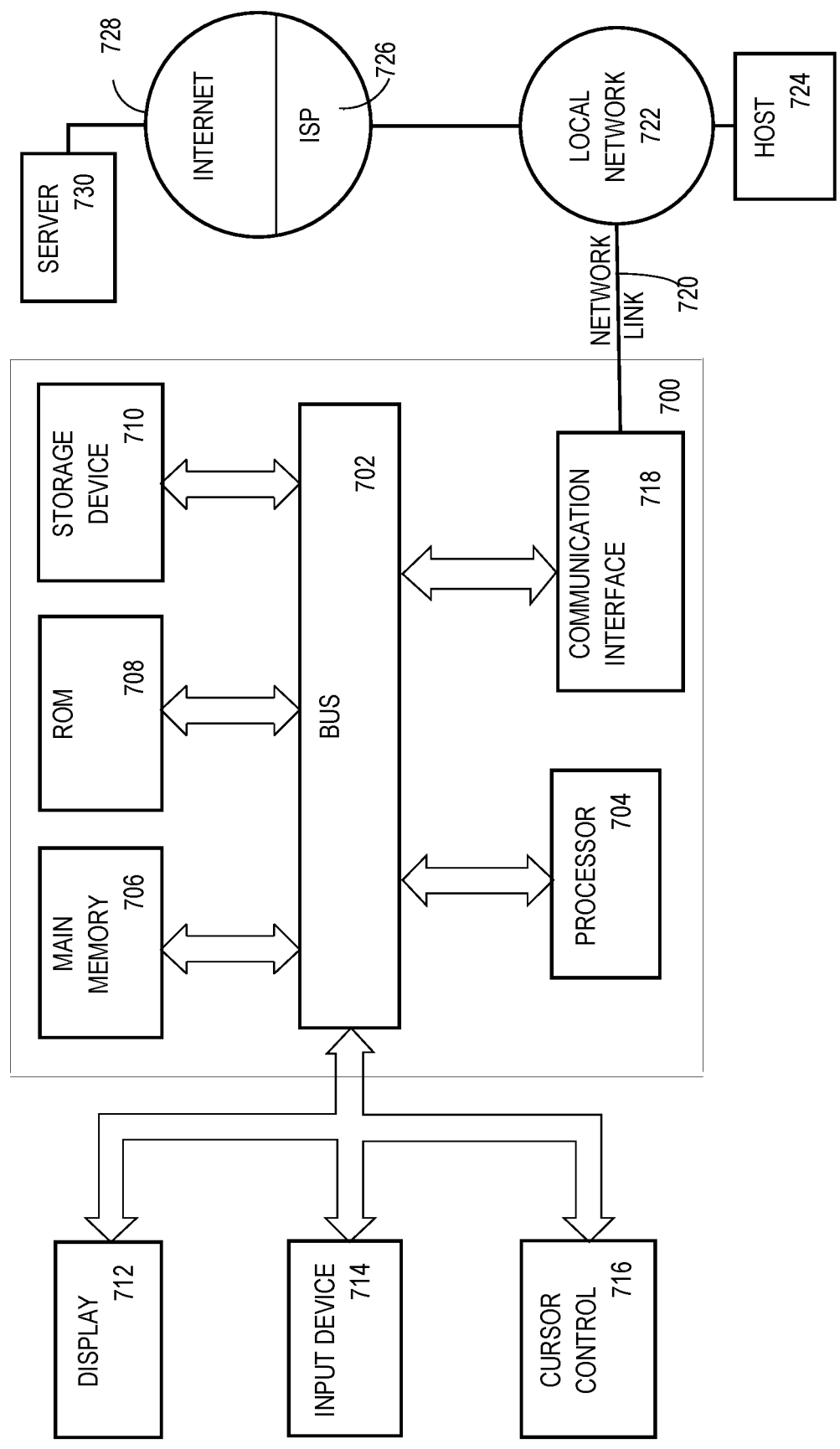
FIG. 7 is a block diagram that illustrates a computer system upon which an embodiment of the invention may be implemented.

FIG. 6 is a block diagram of a basic software system 600 that may be employed for controlling the operation of computing system 700 of FIG. 7. Software system 600 and its components, including their connections, relationships, and functions, is meant to be exemplary only and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or another online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanisms for communicating information and a hardware processor 704 coupled with bus 702 for processing information. Hardware processor 704 may be, for example, a general-purpose microprocessor.

Computer system 700 also includes a main memory 706, such as a random access memory (RAM) or another dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read-only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal, and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or data equipment operated by an Internet Service Provider (ISP) 726. ISP 726, in turn, provides data communication services through the world wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received and/or stored in storage device 710 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a query, the query specifying a first column, which is stored within first format data and within second format data, and a second column, which is stored within the second format data;
   identifying that a scan-based operation is referencing the first column stored within the first format data;
   performing the scan-based operation on the first column within the first format data;
   determining a first actual improvement metric for the scan-based operation from the performing the scan-based operation on the first column within the first format data;
   based on the first actual improvement metric, determining to perform the scan-based operation within the second format data;
   based on determining to perform the scan-based operation within the second format data, continuing to perform the scan-based operation on the first column within the second format data.

2. The method of claim 1, further comprising:
   before the performing the scan-based operation on the first column within the first format data, determining an expected improvement metric for executing the scan-based operation on the first column within the first format data;
   based at least in part on the expected improvement metric, initiating the performing of the scan-based operation on the first column within the first format data.

3. The method of claim 2, wherein initiating the performing of the scan-based operation on the first column within the first format data is further based on one or more of: type of operation to be performed on one or more in-memory columns referenced by the query, type of operation to be performed on one or more disk-only columns referenced by the query, access speed of the first format data, the access speed of the second format data.

4. The method of claim 2, wherein the expected improvement metric is based on pre-run time statistics of the first column.

5. The method of claim 1, further comprising:
   after determining the first actual improvement metric, determining a second actual improvement metric for the scan-based operation from the performing the scan-based operation on the first column within the first format data;

based on the second actual improvement metric, determining to continue performing the scan-based operation within the second format data.

6. The method of claim 1, wherein the first format data is different from the second format data; and wherein the first format data is column-major format data and the second format data is row-major format data, or the first format data is row-major format data and the second format data is column-major format data.

7. The method of claim 1, wherein the first format data is stored in volatile memory and the second format data is stored in persistent storage, or the first format data is stored in persistent storage and the second format is stored in volatile memory.

8. The method of claim 1, wherein, based on the first actual improvement metric, determining to perform the scan-based operation within the second format data, further comprises comparing the first actual improvement metric to a threshold.

9. The method of claim 8, wherein the threshold is based on one or more of: speed difference between speed of access to volatile memory of the first format data and speed of access of persistent storage of the second format data; and overhead of combining results from the first format data and the second format data.

10. The method of claim 8, wherein the first actual improvement metric is based on run-time statistics generated from performing the scan-based operation on the first column within the first format data.

11. One or more non-transitory computer-readable media storing a set of instructions, wherein the set of instructions includes instructions, which when executed by one or more hardware processors, cause:
receiving a query, the query specifying a first column, which is stored within first format data and within second format data, and a second column, which is stored within the second format data;
identifying that a scan-based operation is referencing the first column stored within the first format data;
performing the scan-based operation on the first column within the first format data;
determining a first actual improvement metric for the scan-based operation from the performing the scan-based operation on the first column within the first format data;
based on the first actual improvement metric, determining to perform the scan-based operation within the second format data;
based on determining to perform the scan-based operation within the second format data, continuing to perform the scan-based operation on the first column within the second format data.

12. The one or more non-transitory computer-readable media of claim 11, wherein the set of instructions further comprise instructions, which when executed by the one or more hardware processors, cause:
before the performing the scan-based operation on the first column within the first format data, determining an expected improvement metric for executing the scan-based operation on the first column within the first format data;
based at least in part on the expected improvement metric, initiating the performing of the scan-based operation on the first column within the first format data.

13. The one or more non-transitory computer-readable media of claim 12, wherein initiating the performing of the scan-based operation on the first column within the first format data is further based on one or more of: type of operation to be performed on one or more in-memory columns referenced by the query, type of operation to be performed on one or more disk-only columns referenced by the query, access speed of the first format data, the access speed of the second format data.

14. The one or more non-transitory computer-readable media of claim 12, wherein the expected improvement metric is based on pre-run time statistics of the first column.

15. The one or more non-transitory computer-readable media of claim 11, wherein the set of instructions further comprise instructions, which when executed by the one or more hardware processors, cause:
after determining the first actual improvement metric, determining a second actual improvement metric for the scan-based operation from the performing the scan-based operation on the first column within the first format data;
based on the second actual improvement metric, determining to continue performing the scan-based operation within the second format data.

16. The one or more non-transitory computer-readable media of claim 11, wherein the first format data is different from the second format data; and wherein the first format data is column-major format data and the second format data is row-major format data, or the first format data is row-major format data and the second format data is column-major format data.

17. The one or more non-transitory computer-readable media of claim 11, wherein the first format data is stored in volatile memory and the second format data is stored in persistent storage, or the first format data is stored in persistent storage and the second format is stored in volatile memory.

18. The one or more non-transitory computer-readable media of claim 11, wherein the set of instructions further comprise instructions, which when executed by the one or more hardware processors, cause comparing the first actual improvement metric to a threshold.

19. The one or more non-transitory computer-readable media of claim 18, wherein the threshold is based on one or more of: speed difference between speed of access to volatile memory of the first format data and speed of access of persistent storage of the second format data; and overhead of combining results from the first format data and the second format data.

20. The one or more non-transitory computer-readable media of claim 18, wherein the first actual improvement metric is based on run-time statistics generated from performing the scan-based operation on the first column within the first format data.

* * * * *